(12) United States Patent
Brown et al.

(10) Patent No.: US 7,831,572 B1
(45) Date of Patent: Nov. 9, 2010

(54) MAINTAINING AND DISPLAYING USER ORDERED LISTS

(75) Inventors: Sara M. Brown, Palo Alto, CA (US); Andy Chin, Sunnyvale, CA (US); Hoa N. Lu, Oakland, CA (US); Andre Chen, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 1121 days.

(21) Appl. No.: 11/360,869

(22) Filed: Feb. 23, 2006

Related U.S. Application Data

(62) Division of application No. 10/437,593, filed on May 12, 2003, now Pat. No. 7,130,851.

(51) Int. Cl.
*G06F 7/00* (2006.01)
*G06F 17/00* (2006.01)

(52) U.S. Cl. ........................ 707/695; 707/645

(58) Field of Classification Search ........................ None
See application file for complete search history.

(56) References Cited

U.S. PATENT DOCUMENTS

| | | | |
|---|---|---|---|
| 4,135,389 A | 1/1979 | Karnis et al. | |
| 5,235,509 A | 8/1993 | Mueller et al. | |
| 5,353,219 A | 10/1994 | Mueller et al. | |
| 5,600,825 A | 2/1997 | Atkins et al. | 1/1 |
| 5,754,484 A | 5/1998 | Perreault | |
| 6,055,516 A | 4/2000 | Johnson et al. | |
| 6,178,414 B1 | 1/2001 | Beckmann et al. | |
| 6,243,701 B1 | 6/2001 | Shih et al. | |
| 6,269,361 B1 | 7/2001 | Davis et al. | |
| 6,477,525 B1* | 11/2002 | Bello et al. | 707/999.003 |
| 7,062,735 B2* | 6/2006 | Shim | 716/6 |
| 7,092,961 B2* | 8/2006 | Minezaki et al. | 707/104.1 |
| 7,130,851 B1 | 10/2006 | Brown et al. | 1/1 |
| 7,257,552 B1* | 8/2007 | Franco | 705/28 |
| 7,295,995 B1* | 11/2007 | York et al. | 705/26 |
| 7,676,469 B1 | 3/2010 | Brown et al. | 1/1 |
| 2002/0065802 A1* | 5/2002 | Uchiyama | 707/1 |

OTHER PUBLICATIONS

Dietz, P.F., and D.D. Sleator, "Two Algorithms for Maintaining Order in a List," *Proceedings of the 19th Annual ACM Symposium on Theory of Computing*, New York, May 25, 1987, pp. 365-372.

U.S. Official Action mailed Apr. 1, 2009 cited in U.S. Appl. No. 11/360,910.

* cited by examiner

*Primary Examiner*—Sathyanarayan Pannala
(74) *Attorney, Agent, or Firm*—Merchant & Gould, P.C.

(57) ABSTRACT

A system and method for updating a source copy of an ordered list (the source list) comprising a plurality of list items according to modifications made to the order of the list items in a local copy of the ordered list (the local list) is provided. Each list item includes an order value. The order of the list items is determined according to the order values. To update the source list, the list items that have been moved in the local list are identified and placed on a temporary list, retaining the ordinal position in the local list. For each list item in the temporary list, the list item is placed back in the local list and its order value is set according to the average of the previous list item's order value and the subsequent list item's order value. The list item is then written to the source list.

14 Claims, 15 Drawing Sheets

MAINTAINING AND DISPLAYING USER ORDERED LISTS

CROSS-REFERENCE TO RELATED APPLICATION

This application is a divisional of U.S. patent application Ser. No. 10/437,593, filed May 12, 2003, now patented as U.S. Pat. No. 7,130,851 dated Oct. 31, 2006.

BACKGROUND

Lists are ubiquitous, basic organizational tools used in everyday life. Lists are useful for helping us organize our lives, schedule our daily activities, prioritize the activities of each day, and serve as a reminder while shopping, and so forth. Increasingly, our lists of information are stored electronically. In addition to storing lists electronically, remotely accessing electronically stored list information over a communication network is increasingly popular.

When accessing list information over a communication network, care should be taken to minimize the amount of data exchanged between the access point and the list's remote storage location. For example, the amount of information exchanged between the list's remote storage location and a user's local computer can be minimized by updating the list's remote storage location after the user has completed all intended changes on the list, instead of updating the list's remote storage location after each individual change to the list. Additionally, information exchanged can be further minimized by updating the list's remote storage location only for those list items that have been modified.

Repositioning a single item in a list may potentially cause the entire list to be renumbered. Thus, it would seem that in order to update the list at its remote storage location, each element in the list must be updated. When a list is stored locally, updating the entire list to storage is less problematic, i.e., not using limited network resources/bandwidth. However, updating the list at its remote storage location for each item in the list consumes limited network resources.

Additionally, when accessing list information from a remote location over the Internet using a Web browser, the list is typically displayed with related drop-down controls that identify the order of the list, and permit the user to modify the order of the list items. However, while a user may update the order of elements in the list using these controls, the ordinal values are typically updated, but the list items themselves are not rearranged on screen.

The present invention addresses these and other problems in the prior art by providing a system and method for minimizing the amount of information sent from a user's local computing device to the list's remote storage location to update the list when some of its list items have been reordered. The present invention further provides a system and method for maintaining and displaying a local copy of a list in a Web browser, reflecting changes to the order of the list elements by redisplaying the list elements in their proper order.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A method for updating a source copy of an ordered list according to changes made in a local copy of the ordered list is presented. The ordered list comprises a plurality of list items. Each list item has an order value that the source copy of the ordered list uses to determine the order of the plurality of list items. To update the source copy of the ordered list, those list items that were moved within the local copy of the ordered list are identified. For each identified list item in the temporary list, the identified list item's order value is set to the average of the order values of the previous list item and the next list item. Thereafter, the order value of the identified list item is stored to the source copy of the ordered list.

A method for modifying and updating the order of list items in an ordered list embedding in a Web page using a Web browser is also provided. A Web page including an ordered list comprising a plurality of list items is obtained. Each list item includes a internal order value, on which the order of the list items is determined and displayed in the Web browser. Position controls are correspondingly displayed for each list item. The position controls are user manipulable controls for selecting a new ordinal position for a corresponding list item. The method monitors for user manipulations of the position controls. Upon detecting a user manipulation of a position control, the corresponding list item is identified and the new ordinal position for the corresponding list item is determined. The list item is moved to the new position in the ordered list, and the ordered list is redisplayed on the Web browser according to its new order.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
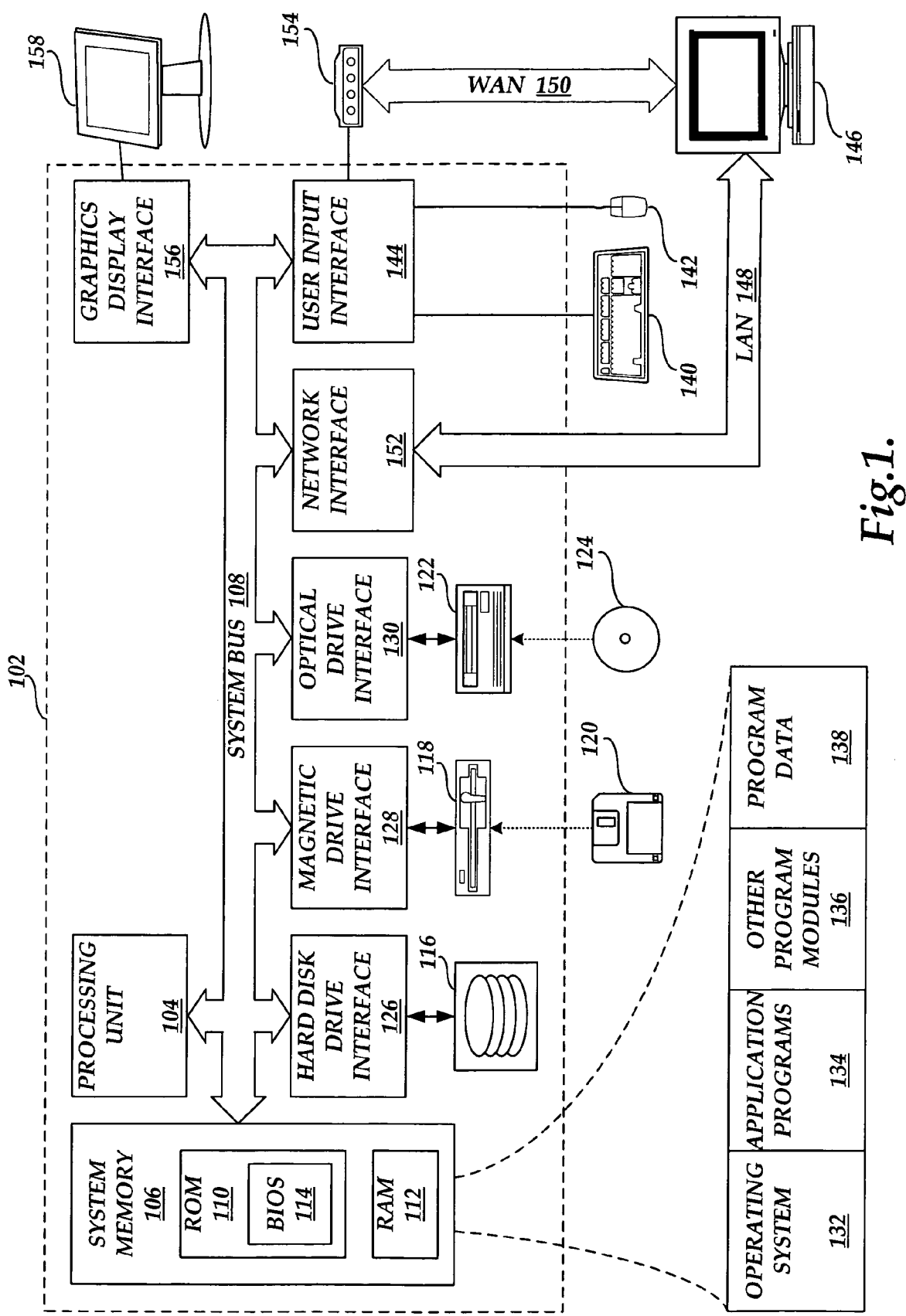
FIG. 1 is a block diagram of an exemplary computer system suitable for implementing the present invention.

FIG. 1 and the following discussion are intended to provide a brief, general description of a computing system suitable for implementing various features of the invention. While the computing system will be described in the general context of a personal computer usable in a distributed computing environment, where complementary tasks are performed by remote computing devices linked together through a communication network, those skilled in the art will appreciate that the invention may be practiced with many other computer system configurations, including multiprocessor systems, minicomputers, mainframe computers, and the like. The invention may be practiced in a local area network or, alternatively, on a single computer using logical, rather than physically remote, devices. In addition to the more conventional computer systems described above, those skilled in the art will recognize that the invention may be practiced on other computing devices including laptop computers, tablet computers, personal digital assistants (PDAs), and cell phone/PDA hybrid devices.

While aspects of the invention may be described in terms of application programs that run on an operating system in conjunction with a personal computer, those skilled in the art will recognize that those aspects also may be implemented in combination with other program modules. Generally, program modules include routines, programs, components, data structures, etc. that perform particular tasks or implement particular abstract data types.

With reference to FIG. 1, an exemplary system for implementing the invention includes a conventional personal computer 102, including a processing unit 104, a system memory 106, and a system bus 108 that couples the system memory to the processing unit 104. The system memory 106 includes read-only memory (ROM) 110 and random-access memory (RAM) 112. A basic input/output system 114 (BIOS), containing the basic routines that help to transfer information between elements within the personal computer 102, such as during startup, is stored in ROM 110. The personal computer 102 further includes a hard disk drive 116, a magnetic disk drive 118, e.g., to read from or write to a removable disk 120, and an optical disk drive 122, e.g., for reading a CD-ROM disk 124 or to read from or write to other optical media. The hard disk drive 116, magnetic disk drive 118, and optical disk drive 122 are connected to the system bus 108 by a hard disk drive interface 126, a magnetic disk drive interface 128, and an optical drive interface 130, respectively. The drives and their associated computer-readable media provide nonvolatile storage for the personal computer 102. Although the description of computer-readable media above refers to a hard disk, a removable magnetic disk, and a CD-ROM disk, it should be appreciated by those skilled in the art that other types of media that are readable by a computer, such as magnetic cassettes, flash memory cards, digital video disks, Bernoulli cartridges, ZIP disks, and the like may also be used in the exemplary operating environment.

A number of program modules may be stored in the drives and RAM 112, including an operating system 132, one or more application programs 134, other program modules 136, and program data 138. A user may enter commands and information into the personal computer 102 through input devices such as a keyboard 140 or a mouse 142. Other input devices (not shown) may include a microphone, touch pad, joystick, game pad, satellite dish, scanner, or the like. These and other input devices are often connected to the processing unit 104 through a user input interface 144 that is coupled to the system bus, but may be connected by other interfaces (not shown), such as a game port or a universal serial bus (USB). A display device 158 is also connected to the system bus 108 via a display subsystem that typically includes a graphics display interface 156 and a code module, sometimes referred to as a display driver, to interface with the graphics display interface. While illustrated as a stand-alone device, the display device 158 could be integrated into the housing of the personal computer 102. Furthermore, in other computing systems suitable for implementing the invention, such as a PDA, the display could be overlaid with a touch-screen. In addition to the elements illustrated in FIG. 1, personal computers also typically include other peripheral output devices (not shown), such as speakers or printers.

The personal computer 102 may operate in a networked environment using logical connections to one or more remote computers, such as a remote computer 146. The remote computer 146 may be a server, a router, a peer device, or other common network node, and typically includes many or all of the elements described relative to the personal computer 102. The logical connections depicted in FIG. 1 include a local area network (LAN) 148 and a wide area network (WAN) 150. Such networking environments are commonplace in offices, enterprise-wide computer networks, intranets, and the Internet.

When used in a LAN networking environment, the personal computer 102 is connected to the LAN 148 through a network interface 152. When used in a WAN networking environment, the personal computer 102 typically includes a modem 154 or other means for establishing communications over the WAN 150, such as the Internet. The modem 154, which may be internal or external, is connected to the system bus 108 via the user input interface 144. In a networked environment, program modules depicted relative to the personal computer 102, or portions thereof, may be stored in the remote memory storage device. It will be appreciated that the network connections shown are exemplary and other means of establishing a communications link between the computers may be used. In addition, the LAN 148 and WAN 150 may be used as a source of nonvolatile storage for the system.

Figure 2:
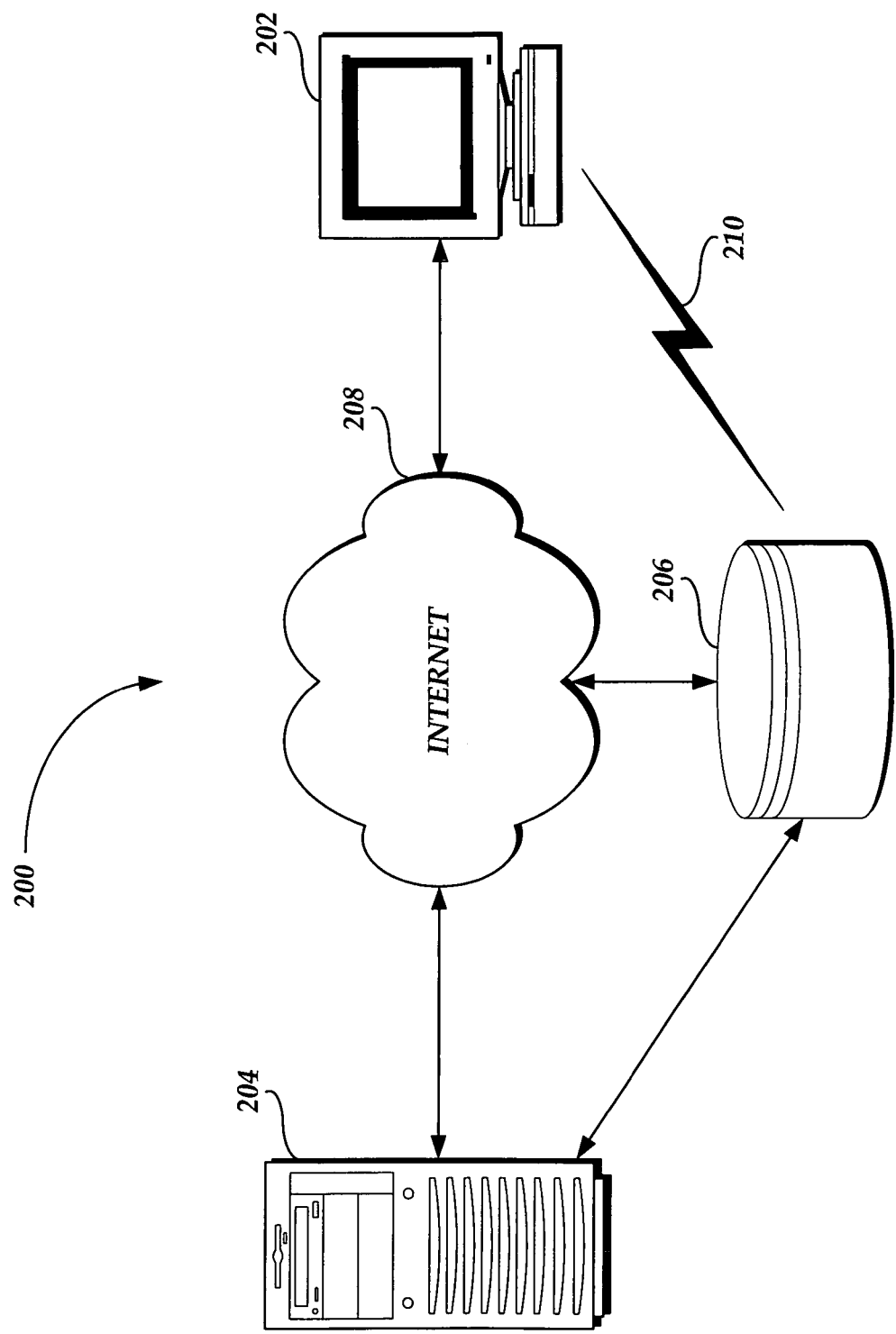
FIG. 2 is a pictorial diagram of an exemplary networked computing environment suitable for implementing the present invention.

FIG. 2 is a block diagram of an exemplary networked computing environment 200 suitable for implementing the present invention. The exemplary networked computing environment 200 includes a computing device 202, such as the personal computer 102 described above in regard to FIG. 1, upon which a user may obtain a local copy of an ordered list from a remote storage location, manipulate the order of items in the list, and save the changes to the list back to its remote storage location.

As shown in FIG. 2, the computing device 202 may be connected to a remote server 204, which may act as the permanent storage location for an ordered list. In this illustrative example, the computing device 202 is connected to the remote server 204 via a communication network, such as the Internet 208. Those skilled in the art will recognize that other communication networks may be used without departing from the scope of the present invention. Attached to the remote server 204 is a database 206 on which the remote server 204 may store information, including ordered lists. Alternatively, the computing device 202 may have direct access the database 206 through a communication network, such as the Internet 208, or any number of other communication means, including a wireless connection 210, to retrieve and store information including an ordered list.

While the present invention will be described in terms of a local copy of an ordered list and a remote storage location for the ordered list, it should be understood that present invention may also be practiced in an entirely local environment. Practicing the invention in a local environment will produce similar, though perhaps less perceptible, benefits and advantages, as when practicing the invention in a networked environment, such as the network environment 200 described in FIG. 2, including minimizing the amount of data written to the list's storage location when list items have been modified.

Figure 3B:
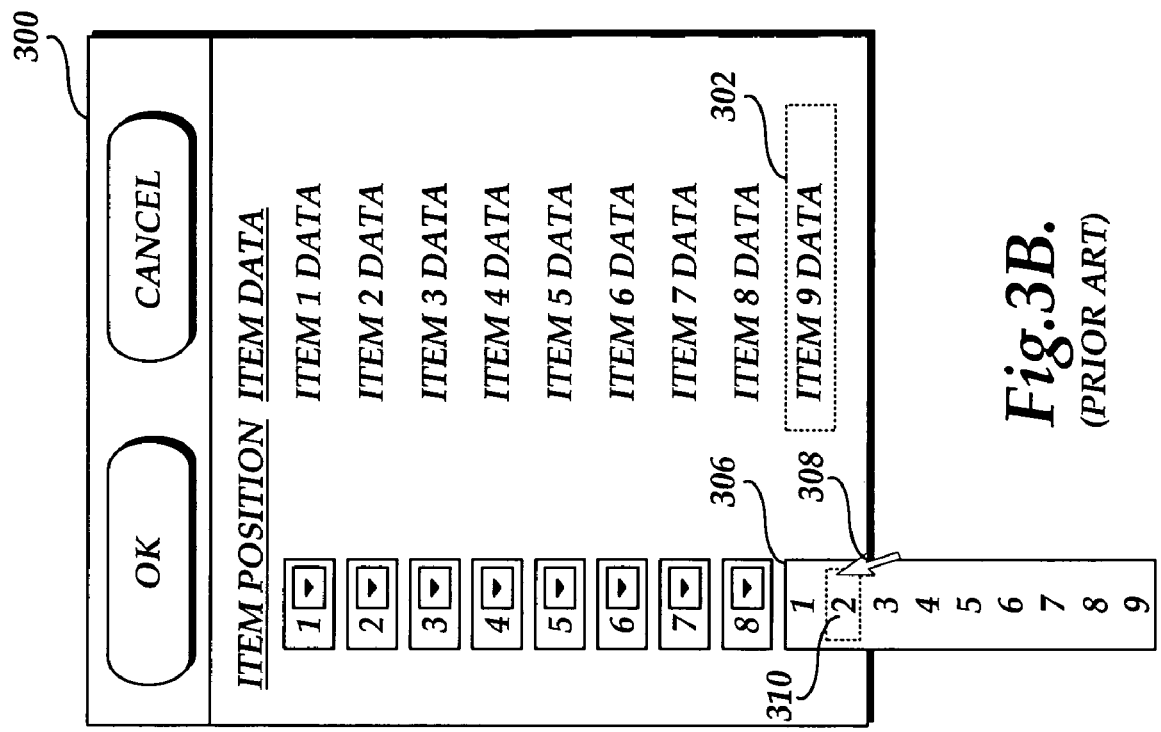
FIGS. 3A-3C are pictorial diagrams illustrating an exemplary Web page displayed on a Web browser for displaying and manipulating the order of an exemplary list, as found in the prior art.
Figure 3A:
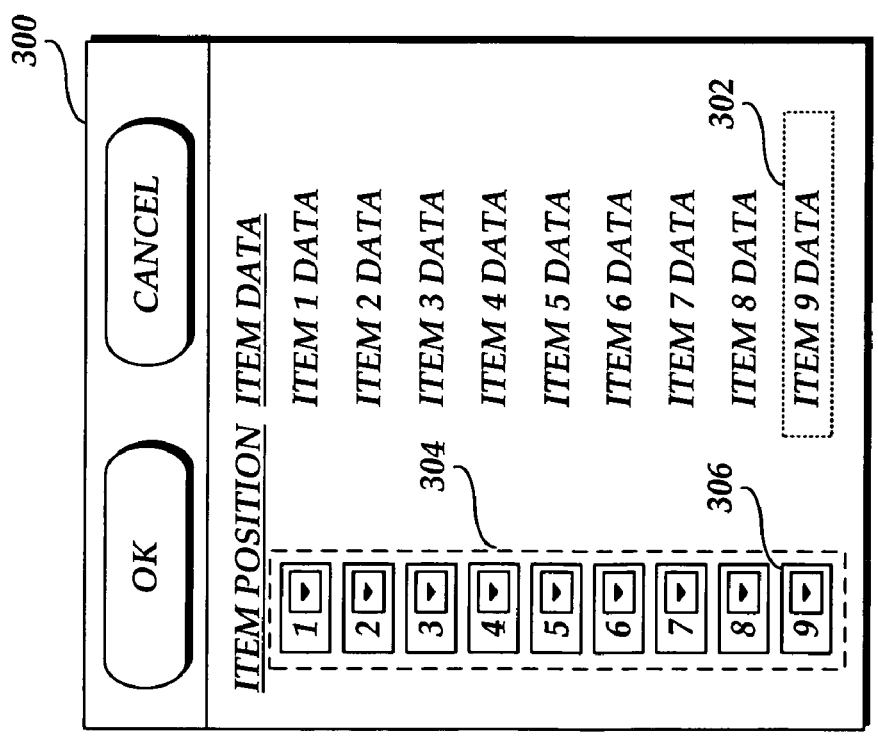
Figure 3C:
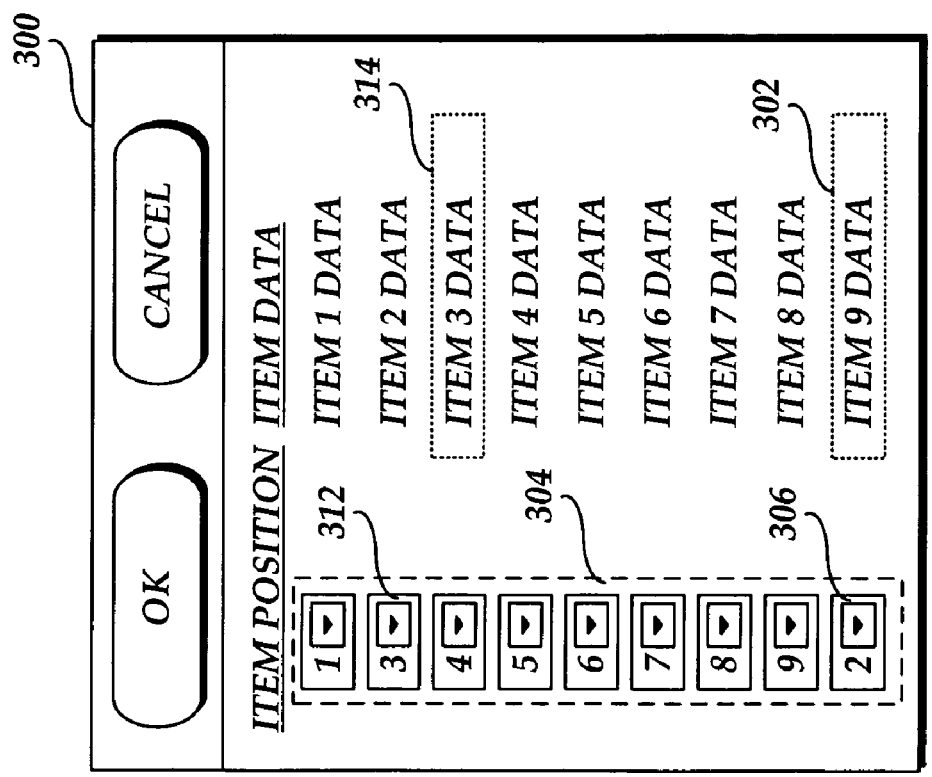

FIGS. 3A-3C are pictorial diagrams illustrating an exemplary view 300 on a Web page displayed by a Web browser for displaying and manipulating the order of an ordered list, as found in the prior art. With reference to FIG. 3A, view 300 displays an ordered list of multiple list items, such as list item 302. View 300 is illustrative of the unmodified order of the list items in the ordered list as retrieved from the list's remote storage location. View 300 displays a set of controls 304 for displaying both the ordinal position of a corresponding list item and for changing the order of the list items. For example, control 306 displays the ordinal position as "9" for list item 302. The controls in the set of controls 304 are commonly referred to as drop-down controls. Those skilled in the art will recognize that drop-down controls, when manipulated, present a user with alternative selections for the control. Other types of controls may also be used to manipulate the order of list items.

FIG. 3B illustrates the view 300 as a user interacts with the drop-down control 306. As mentioned above, when a user manipulates a control, such as placing a cursor 308 over the control 306 and clicking on it, the control displays a list of ordinal values representing list positions from which the user may select in order to modify the corresponding list item's position in the list. As illustrated in FIG. 3B, a user changes the position of list item 302, currently in the 9th position, to the 2nd position by selecting the desired ordinal value, as indicated by box 310, with the cursor 308, and clicks on that selection.

FIG. 3C illustrates view 300 after the user has modified the position for list item 302 in the ordered list. As illustrated, list item 302 did not change its physical location on the view 300. Instead, the corresponding control 306 has been updated to reflect that it now occupies the second position. Other controls in the control set 304 have been similarly updated according to list item's 302 new position. For example, the list item 314 corresponding to control 312 has been updated from the second position to the third position. Others have similarly moved down. However, as found in the prior art, the list items are not displayed on view 300 in their updated order. As can be seen in the prior art, while the position of items may be changed, the screen locations of the moved list items are not changed.

Figure 4B:
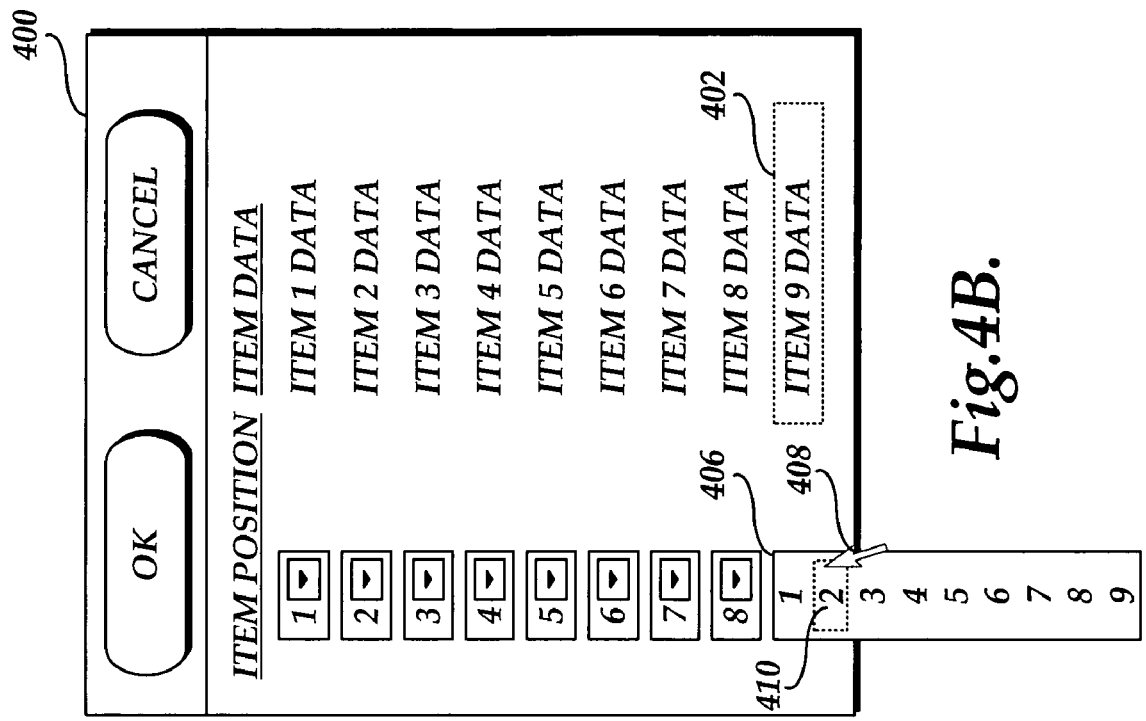
FIGS. 4A-4C are pictorial diagrams illustrating an exemplary Web page displayed on a Web browser for displaying and maintaining the order of an exemplary list in, accordance with the present invention.
Figure 4A:
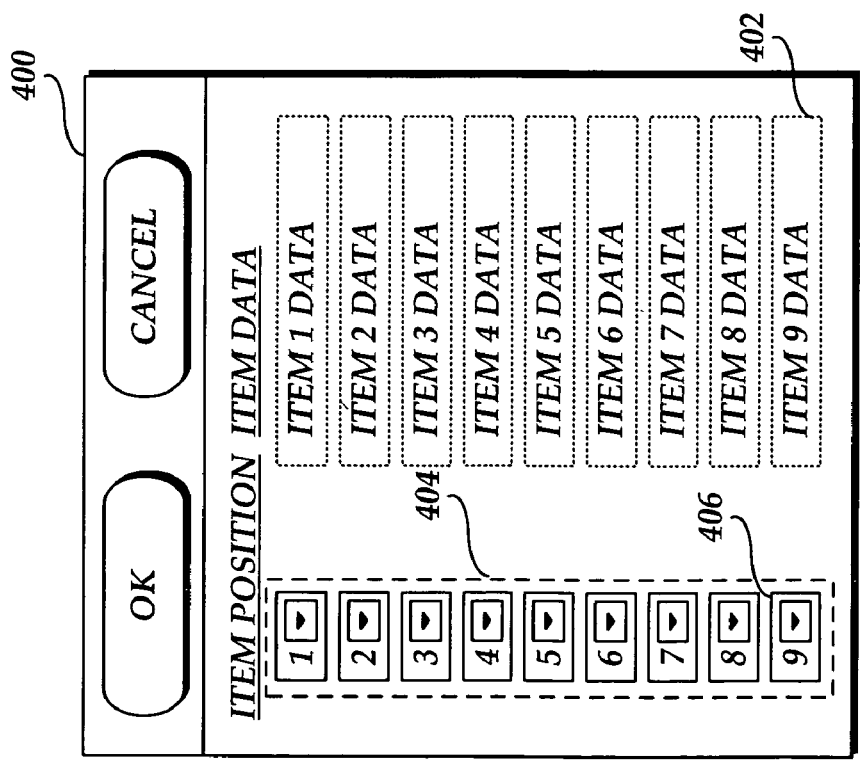
Figure 4C:
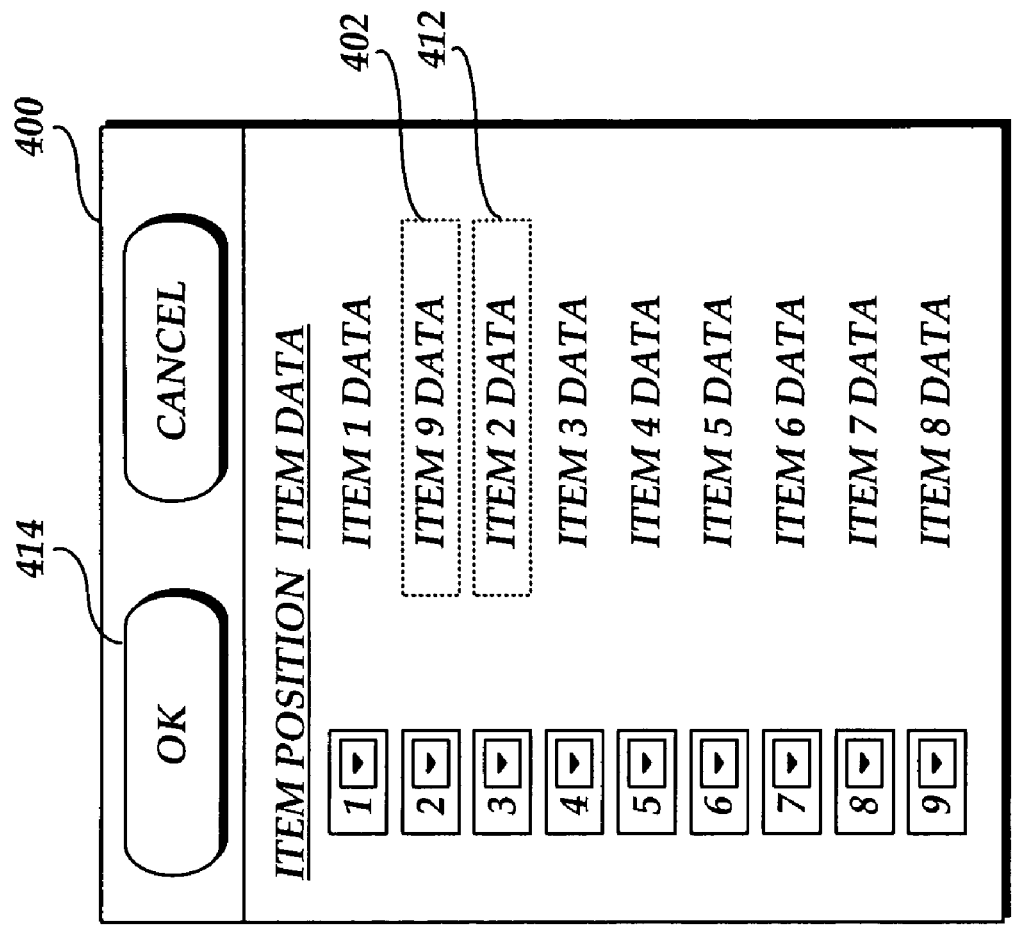

FIGS. 4A-4C are pictorial diagrams illustrating an exemplary view 400 on a Web page displayed by a Web browser for displaying and manipulating the order of an ordered list, in accordance with the present invention. With reference to FIG. 4A, view 400 displays an ordered list of multiple list items, such as list item 402. View 400 is illustrative of the unmodified order of the list items in the ordered list as retrieved from the list's remote storage location. View 400 displays a set of drop-down controls 404 for displaying and modifying the ordinal position of a corresponding list item, such as control 406 displaying the ordinal position "9" for list item 402.

FIG. 4B illustrates view 400 as a user interacts with drop-down control 406. When a user places the cursor 408 over control 406 and clicks on it, the control displays a list of ordinal values representing list positions from which the user may select a new position for the list item. Thus, to change the list item 402 from the ninth position to the second position, the user places the cursor 408 over the desired position, as indicated by box 410, and clicks on that selection.

In contrast to view 300 of FIG. 3C, the view 400 in FIG. 4C illustrates that, according to the present invention, upon modifying the drop-down control for list item 402, affected list items in the ordered list are rearranged and displayed in the view according to their new position. For example, list item 402, previously located at the end of the list, has been moved to its new position in the list, just above list item 412. The other list items that were affected by moving list item 402 have been similarly moved down. It should be understood that, while FIGS. 4A-4C illustrate changing the order of the list through the use of drop-down controls, they are illustrative only, and should not be construed as limiting upon the present invention. In addition, as previously discussed, once modified, the changes to the order of list items in the local copy of the ordered list is not stored to its remote storage location until the user commits the changes to storage.

Figure 8A:
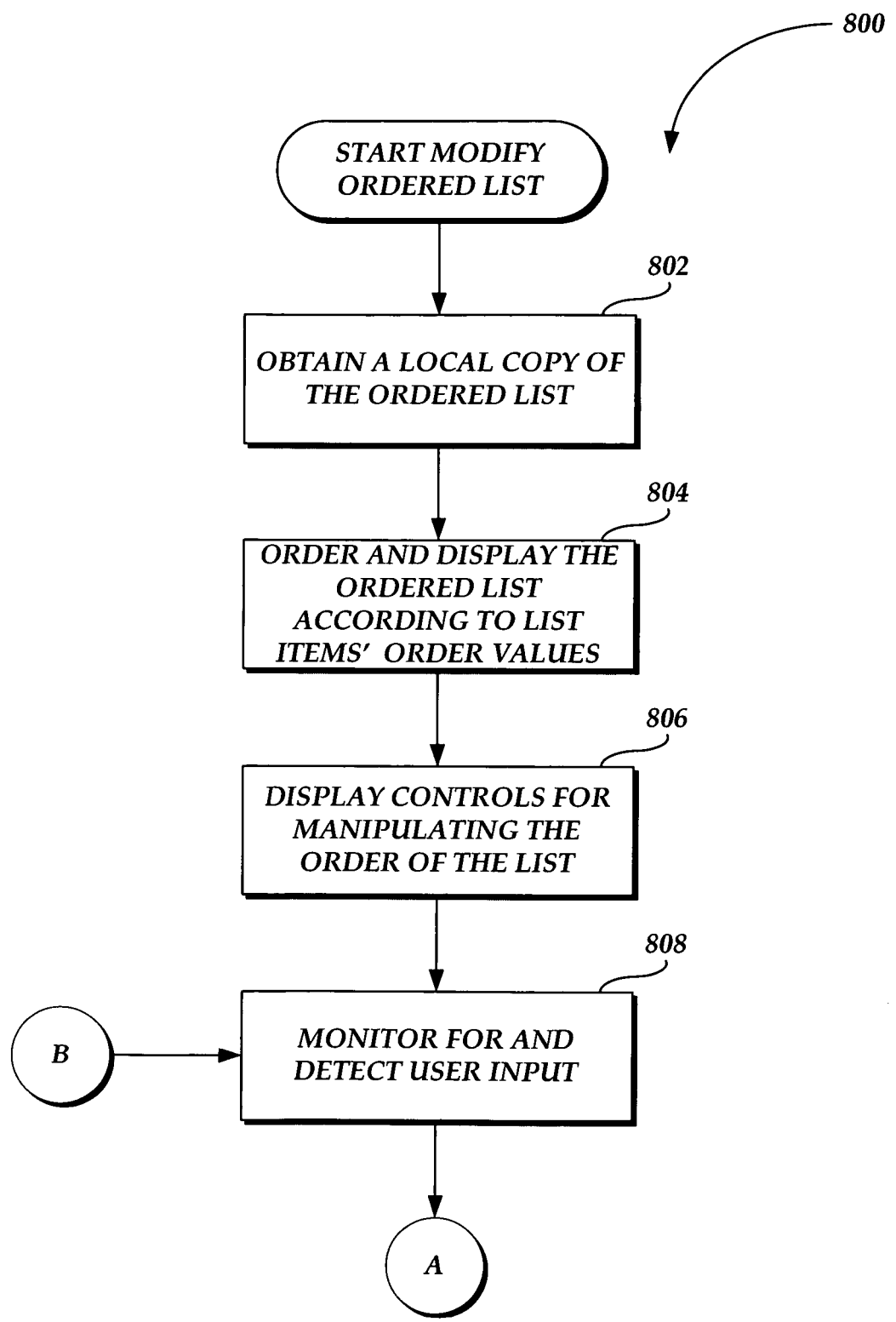
FIGS. 8A and 8B are flow diagrams illustrative of an exemplary modify ordered list routine for modifying an ordered list embedded in a Web page using a Web browser, such as view described in regard to FIG. 4.
Figure 8B:
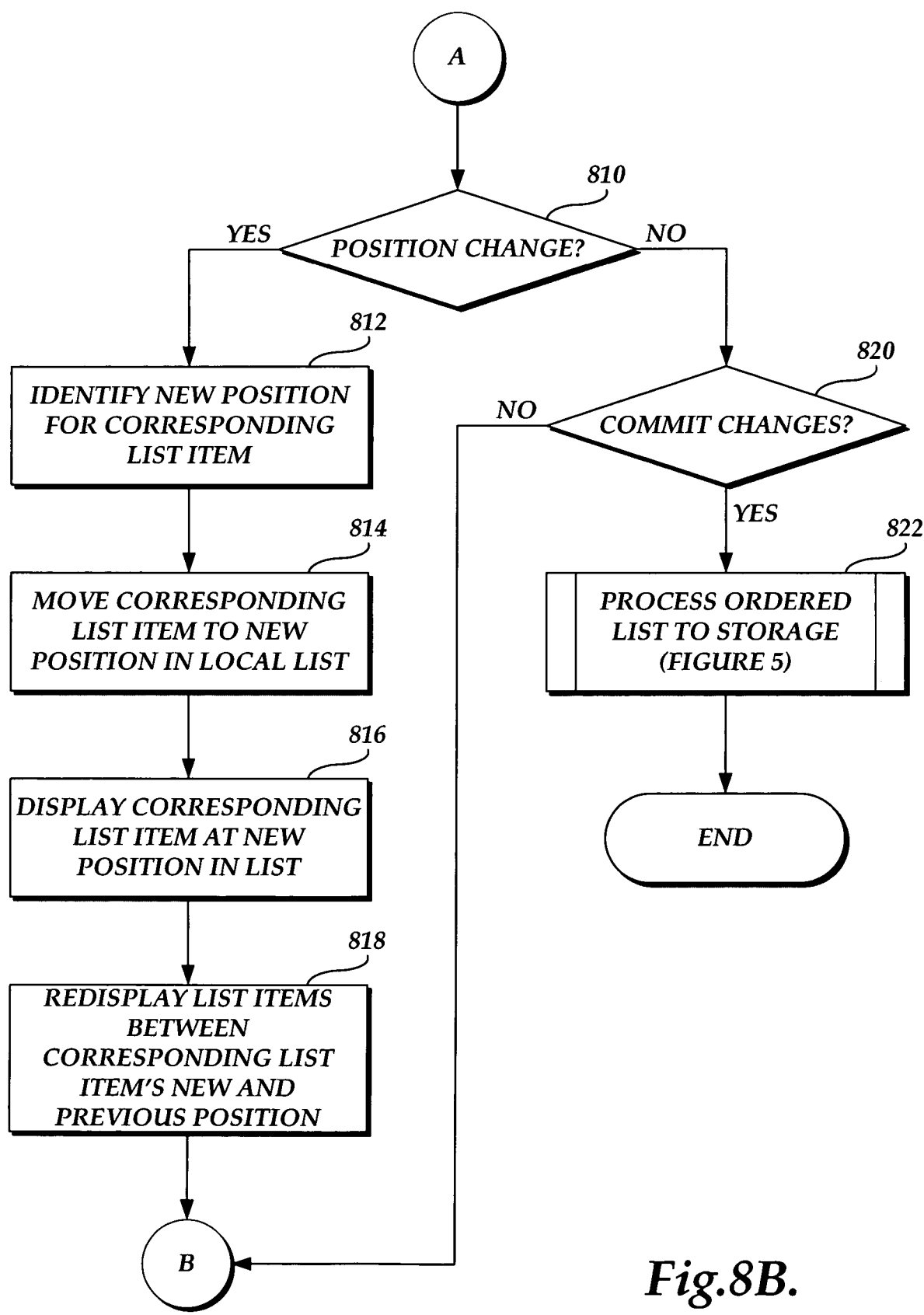

FIGS. 8A and 8B are flow diagrams illustrative of an exemplary modify ordered list routine 800 for modifying an ordered list in a Web page using a Web browser, such as view 400 described above in regard to FIG. 4. Beginning at block 802, a Web page including a copy of the ordered list is retrieved. Retrieving Web pages using a Web browser is known in the art. The ordered list comprises a plurality of list items. Each list item includes an order value, upon which the order of the list items is determined in the source location. According to one embodiment, the Web page includes the list items of the ordered list, ordered according to their order in the source storage location. Alternatively (not shown), the list items are ordered according to their order values when the Web page is retrieved. The Web page also includes code modules, or scripts, written in VBScript or JavaScript for example, to manipulate the order of the list items and display them using the abilities of dynamic Hypertext Markup Language (DHTML).

At block 804, using the scripts embedded in the Web page, the list items are displayed in a view on the Web browser, such as view 400 of FIG. 4A. At block 806, user interactive position controls indicating a corresponding list item's position are also displayed such that each list item is displayed with a corresponding position control. According to one embodiment, a drop-down control indicating an ordinal position in the list is displayed for each list item. At block 808, the process monitors for user input. User input may be a user manipulation of one of the position controls to move a list item in the ordered list. Alternatively, the user input may be the manipulation of a commit control indicating that the changes to the list are to be committed to the remote storage location, such as the "OK" control 414 of FIG. 4C.

After detecting user input, at decision block 810 (FIG. 8B), a determination is made as to whether the user input was a manipulation of a position control to change the ordinal position of a list item. If the user action was a manipulation of a position control to change the ordinal position of a list item, at block 812, the new position for the corresponding list item is determined. At block 814, the corresponding list item is moved from its previous position to the new position in the ordered list. Additionally, (not shown) a value associated with the moved list item may be set, indicating that the list item has been moved. Setting such a value is sometimes referred to as setting a "Dirty" flag, and is useful for later identifying which list items in the ordered list have been moved.

At block 816, the corresponding list item is displayed at its new position in the ordered list. At block 818, those list items between the corresponding list item's previous and new ordinal positions are redisplayed to reflect the change to the corresponding list item's ordinal position. Because the list items are redisplayed in order, the position controls corresponding to the list items are not updated, instead they retain their previous position values. Thereafter, the process returns again to block 808 (FIG. 8A)

Alternatively, at decision block 810 (FIG. 8B), if the user action was not a manipulation of a position control, at decision block 820, another determination is made as to whether the user action was a manipulation of a commit control. For example, clicking on the "OK" control 414 (FIG. 4C) would indicate that the changes made to the ordered list should be committed to the remote storage location. If the user action was not a manipulation of a commit control, the process returns to block 808 (FIG. 8A). Alternatively, if the user action is a manipulation of a commit control, at block 822, the ordered list is processed to the remote storage location. According to one embodiment, processing the ordered list to the remote storage comprises posting the moved list items to the Web site from where the Web page was retrieved. Posting information to a Web site is known in the art. Processing the ordered list to storage is described in greater detail below in regard to FIG. 5. Thereafter, the routine 800 terminates.

In the examples described above in regard to FIGS. 4A-4C, it would appear that, in addition to a moved list item, those list items whose ordinal positions are changed due to the moved list item must also be updated to the remote storage location when the user commits changes back to storage in order to maintain proper ordering in the ordered list. However, aside from their ordinal positions in the list, these affected list items did not change. By managing the ordered list, not by their apparent ordinal positions, but by an internal order value, described in greater detail below, the present invention minimizes the amount of information that must be written to the remote storage location to selected and modified list items.

Figure 9:
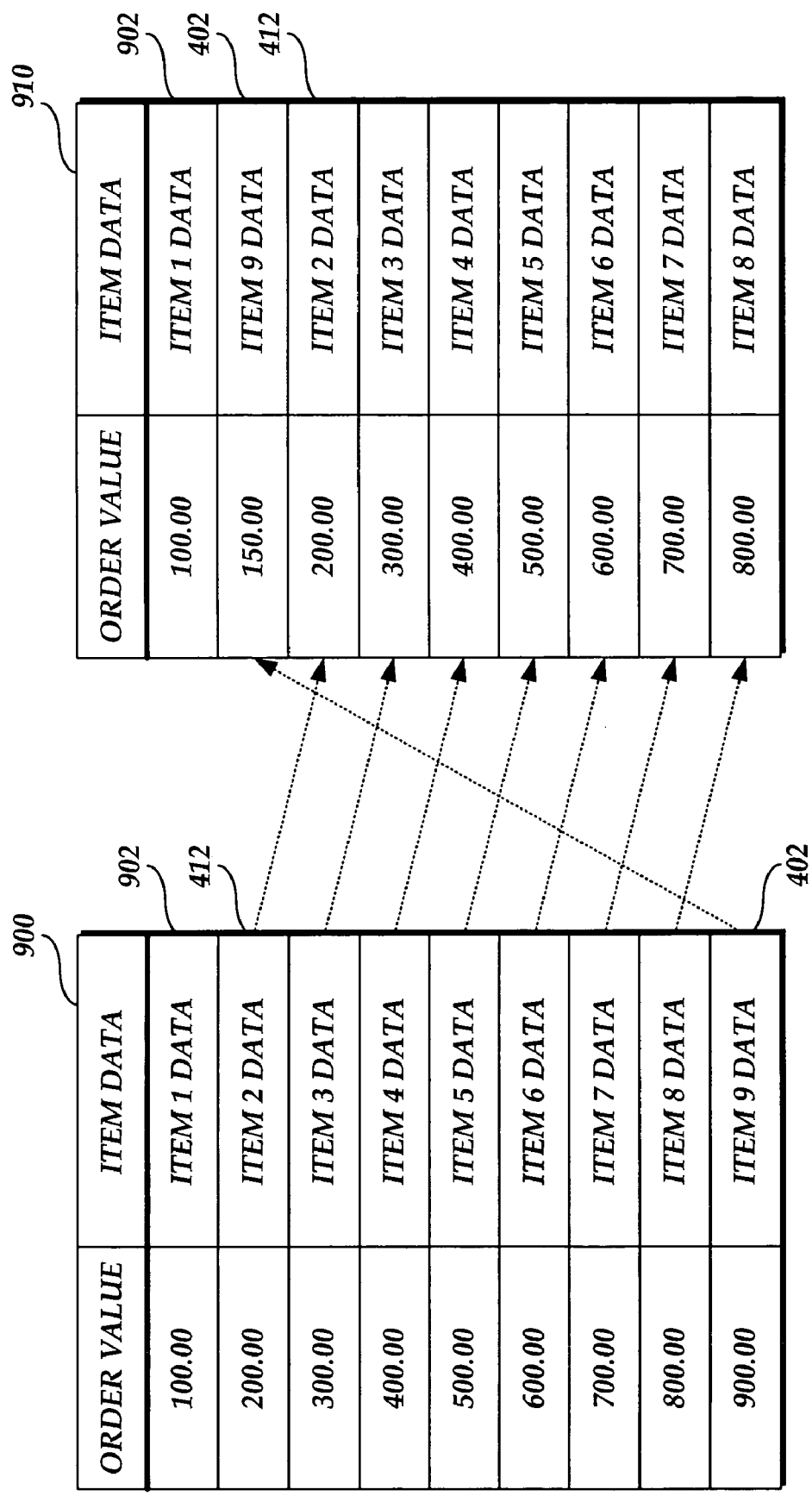
FIG. 9 is a block diagram illustrating a tables containing the ordered list shown in FIG. 4A including corresponding internal order values for each list item.

According to the present invention, each list item includes an order value. As mentioned above, this order value is an internal value used by the present invention to manage the order of the list items, and to minimize the amount of information written to the remote storage location when saving changes made to the order of list items in the ordered list. FIG. 9 is a block diagram illustrating a table 900 containing the ordered list shown in the view 400 (FIG. 4A), including the corresponding internal order values for each list item. Each row in the table 900 represents a list item in the ordered list. In the preferred embodiment, the order value of each list item is a floating point value. In an alternative embodiment, an integer value may be used. Additionally, while the exemplary table 900 illustrates only two elements to each list item, specifically "Order Value" and "Item Data," it is for illustration purposes only, and should not be construed as limiting upon the present invention. Those skilled in the art will recognize that each list item may contain any number of elements as item data.

Table 900 illustrates the ordered list arranged according to their determined ordinal positions. Thus, list item 902 is the first item in the ordered list, list item 412 is the second item in the ordered list, and list item 402 is the last item in the ordered list. However, the ordinal position of a list item is determined according to its order value in relation to the order values of the other list items in the ordered list. Hence, list item 902 is first in the ordered list because its order value, 100.00, is the lowest among all the list items in the ordered list. List item 412 is second in the ordered list because its order value, 200.00, is the second lowest in the ordered list. Likewise, list item 402 is last in the ordered list because its order value, 900.00, is the highest in the ordered list. While in one embodiment the order of the ordered list is determined in an ascending manner according to the order values of the list items with the lowest order value identifying the first list item, in an alternative embodiment, the order of the ordered list is determined in a descending manner according to the order values with the highest order value identifying the first list item in the ordered list.

Figure 10A:
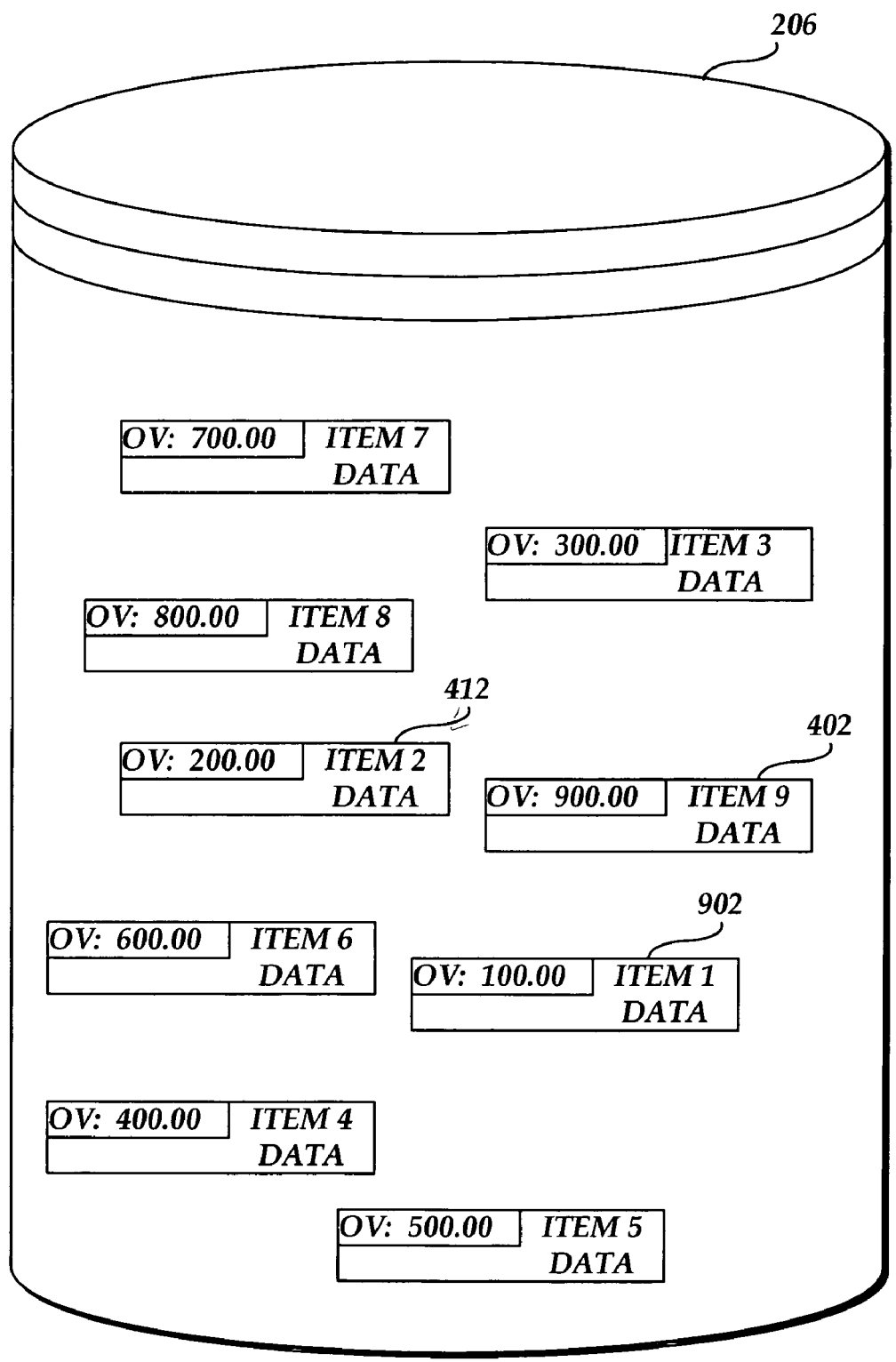
FIGS. 10A and 10B are pictorial diagrams illustrating the ordered list shown in tables in FIG. 9 as stored in a remote storage location.

While the list items of the ordered list are shown in a contiguous, ordered fashion in table 900, the storage of these items does not require such contiguity. FIG. 10A is a pictorial diagram illustrating the ordered list shown in table 900 as stored in a remote storage location, such as database 206. Those skilled in the art will recognize that database 206 could be any type of storage device, included a relational database and a flat-file database. Additionally, the list items stored on the remote storage location need not be stored contiguously or in order, as illustrated in FIG. 10A, and as is common among commercially available databases. For example, on a relational database, queries for a first and next item may be made on the database, irrespective of the internal storage locations.

Figure 10B:
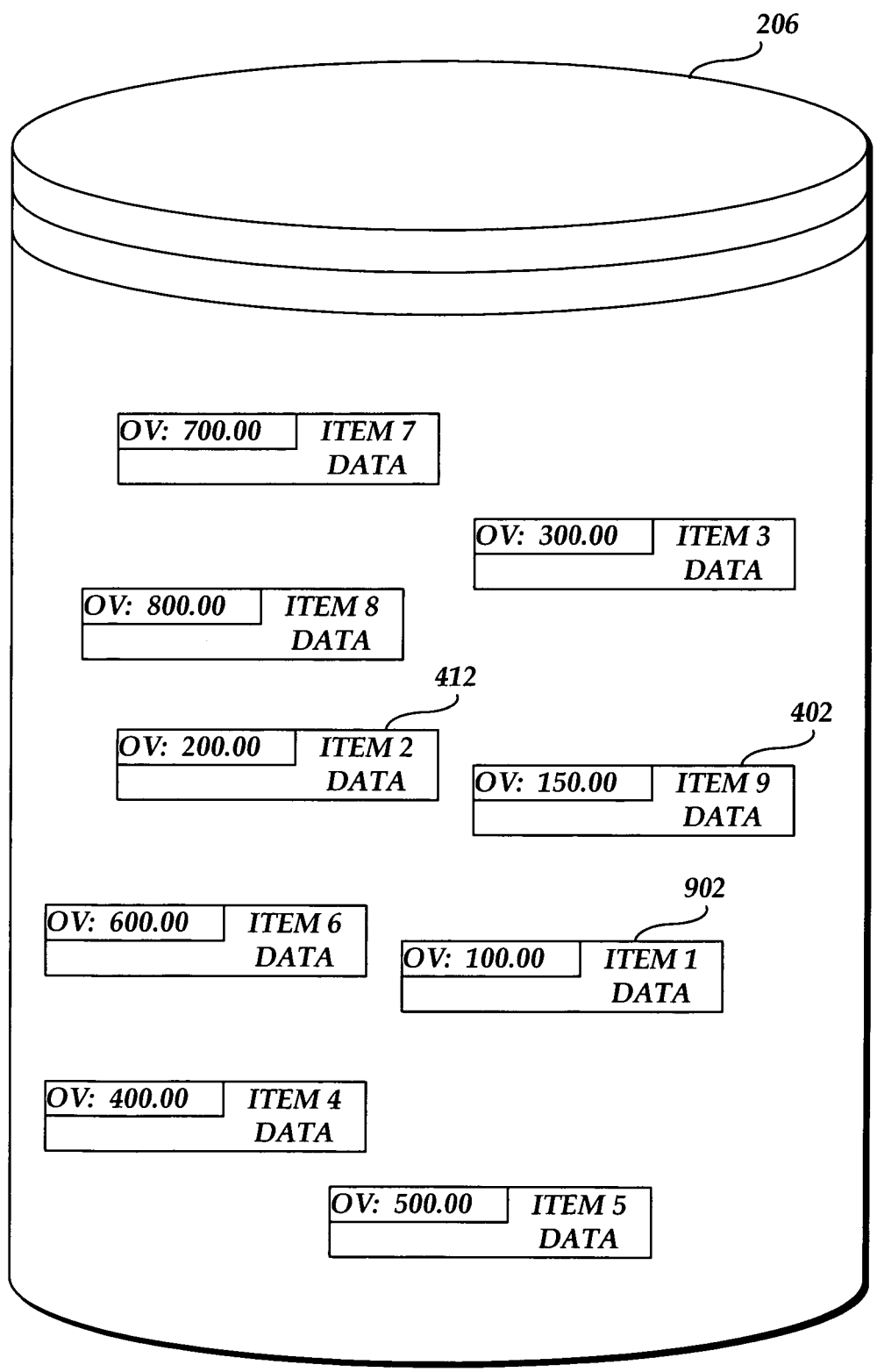

With reference to FIG. 9, table 910 represents the ordered list shown in table 900 after a user has changed the ordinal position of list item 402, as described above in regard to FIGS. 4A-4C. According to the present invention, when a list item is moved to a new position in an ordered list, the order value of the moved list item is updated according to the order values of the list items adjacent to the new position in the ordered list. Thus, as illustrated by the arrows between table 900 and table 910, as a result of reordering list item 402 to the second position in the ordered list, the order value for list item 402 is changed to a value, 150.00, that is between the previous list item's order value, 100.00 for list item 902, and the subsequent list item's order value, 200.00 for list item 412. While the other list items changed their ordinal position due to the insertion of list item 402, the data corresponding to the other list items did not change, including their order values. Thus, only the data for the moved list item 402 needs to be updated on remote storage location. As shown in FIG. 10B, only list item 402 has been modified in the database 206.

As previously discussed, according to the present invention, changes to the order of list items in an ordered list are not processed until a user specifically commits the changes to the remote storage location. This may occur when the application that is used to edit the list is closed, or alternatively, with a specific store command within the application. Upon detecting the storage command, the present invention identifies those list items that must be updated and stored to the remote storage location. According to one embodiment, processing of moved list items is performed by a remote server that is associated with or controls access to the remote storage location. When the changes are processed by the remote server, the moved list items, and their new ordinal positions, must be identified to the remote server. Alternatively, processing may be performed locally on the users computer with the updated order values transmitted to the remote storage location.

Figure 5:
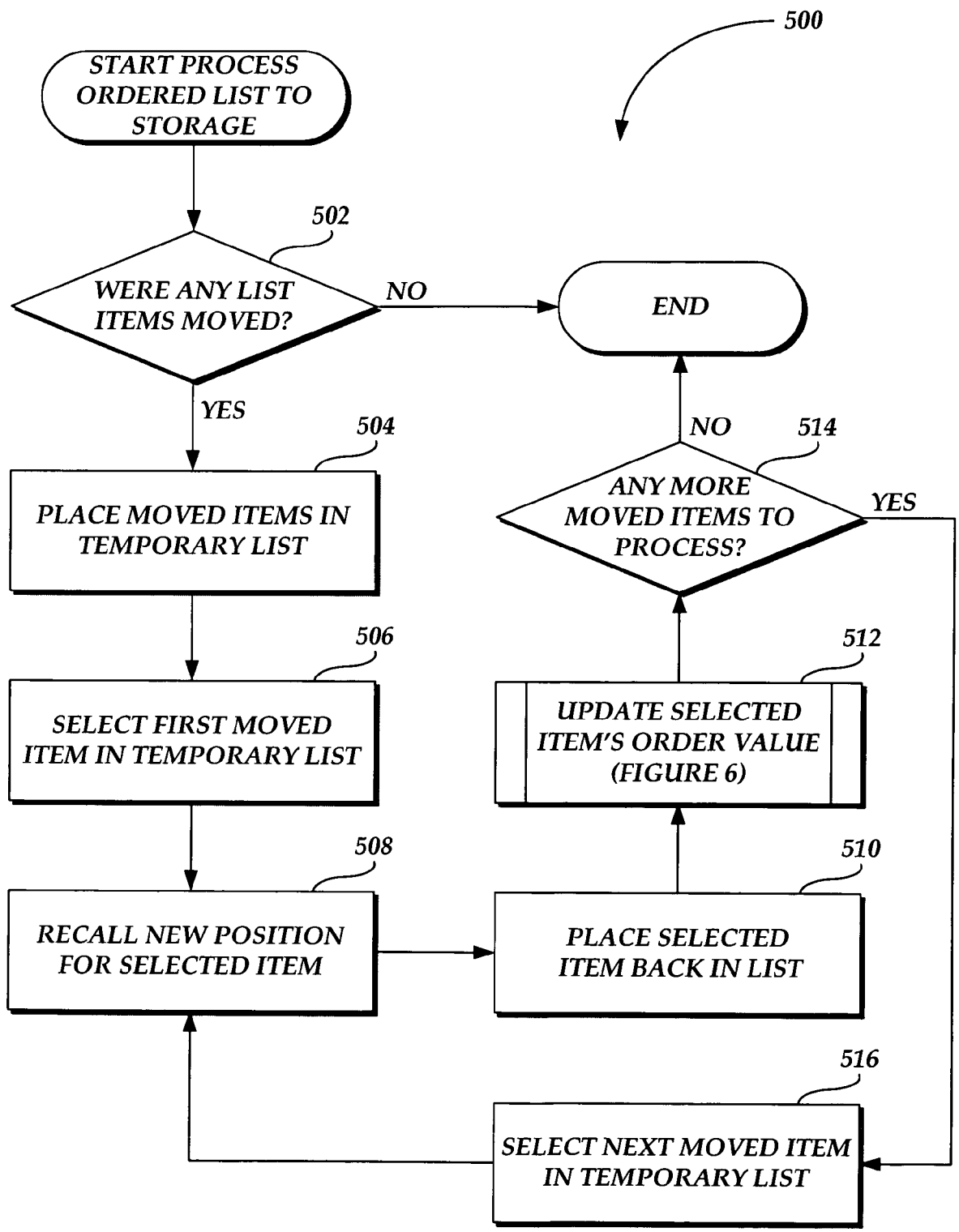
FIG. 5 is a flow diagram illustrating an exemplary processing list to storage routine for processing a local copy of a user list for storage to its remote storage area.

FIG. 5 is a block diagram illustrating an exemplary process ordered list to storage routine 500 for storing moved list items in an ordered list to the ordered list's remote storage location. Beginning at decision block 502, a determination is made as to whether any list items in the ordered list were moved. If no list items in the ordered list were moved, the routine 500 terminates. However, if any of the list items in the ordered list were moved, at block 504, those list items that were moved are placed in a temporary list. While the list items are placed on the temporary list, their current ordinal position within the list is retained. In one embodiment, the list items are locally removed from the ordered list. Alternatively, the moved list items may be marked as being in the temporary list. For example, the order values of the moved list items may be set to an invalid number, thereby marking them as on the temporary list. Placing the moved list items on the temporary list is useful later when determining the order values of adjacent list items as their order values should not be considered until they have been processed.

At block 506, a first list item from the list items that were placed on the temporary list is selected. At block 508, the new position for the selected item is recalled. This corresponds to the ordinal position value retained above when moving the list item to the temporary list. At block 510, the list item is added back to the ordered list at the recalled position. At block 512, the order value for the selected list item is updated according to the adjacent list items. Updating the selected list item's order value is described below in regard to FIGS. 6A and 6B.

Figure 6A:
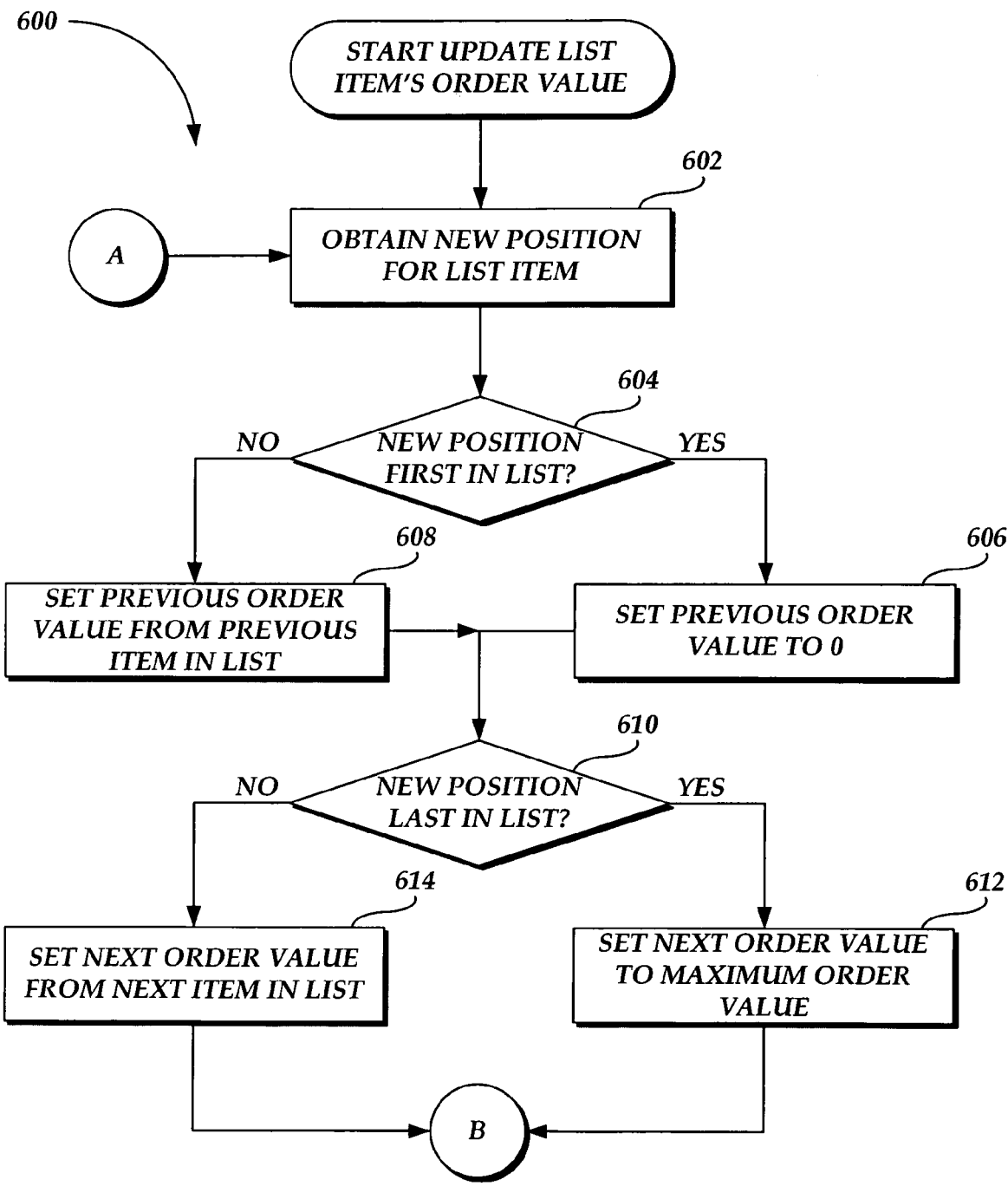
FIGS. 6A and 6B are flow diagrams illustrating an exemplary update list item's order value routine suitable for use in the exemplary process list for storage routine of FIG. 5 for updating a moved list item's order value according to its new position in a list.
Figure 6B:
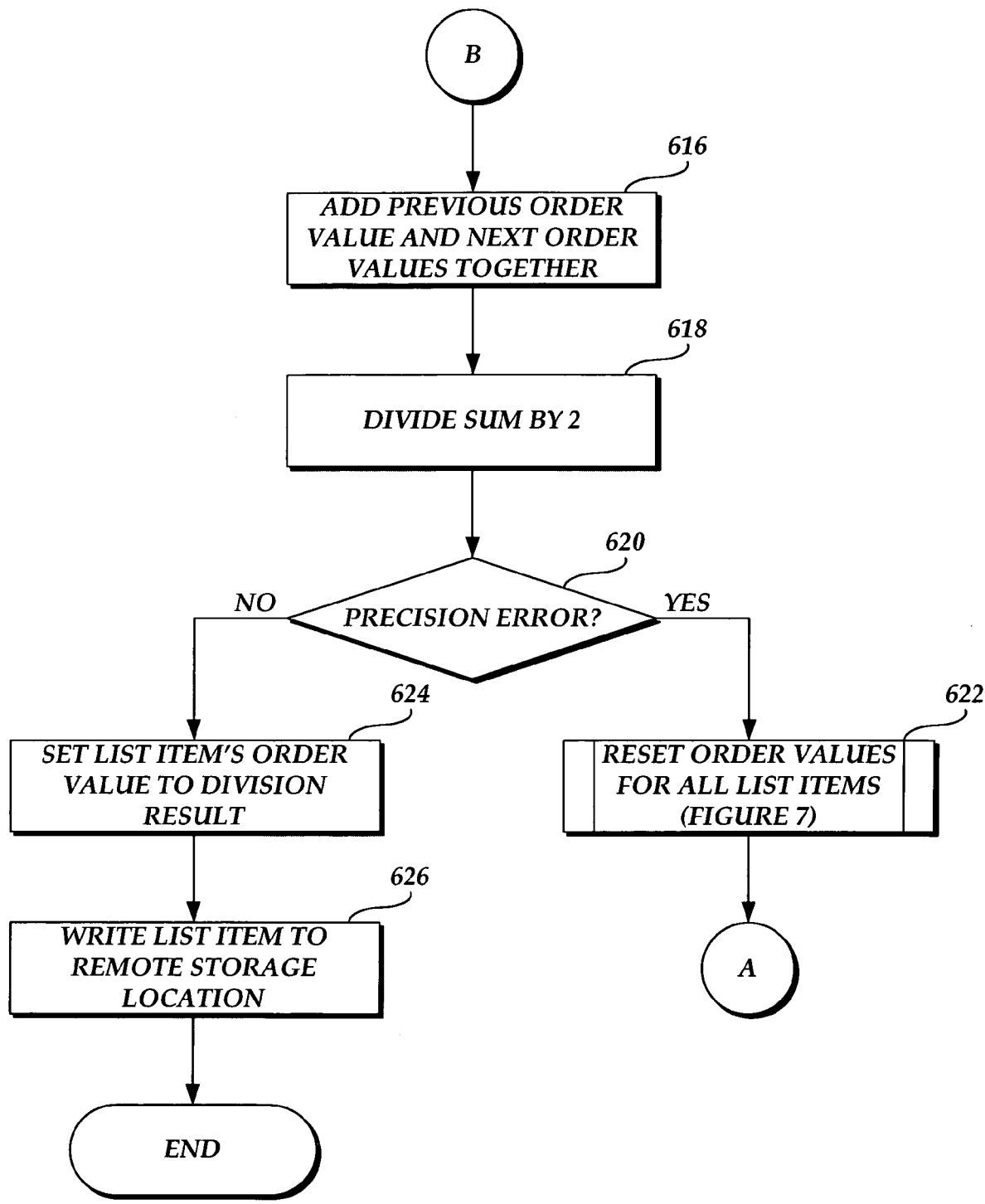

FIGS. 6A and 6B are block diagrams illustrating an exemplary update item's order value routine 600 updating a list item's order value according to its new position in an ordered list. Beginning at block 602 (FIG. 6A), the new position for the list item is obtained. Those skilled in the art will recognize that this may have been passed as a parameter when the routine 500 was called. Alternatively, the new position may have been stored in a global location accessible to this routine. As yet another alternative, the new value may be stored with the list item. Those skilled in the art will recognize that there are many alternatives for obtaining the new location. Accordingly, these discussed alternatives are for illustration purposes, and should not be construed as limiting upon the present invention.

At decision block 604, a determination is made whether the new position for the list item is the first position in the ordered list. If the new position is the first in the ordered list, at block 606, a temporary previous order value is set to zero. Alternatively, if the new position is not the first position in the ordered list, at block 608, the temporary previous order value is set according to the order value of the list item immediately preceding the new position.

After having established a value for the temporary previous order value, at decision block 610, a determination is made as to whether the new position for the list item is the last position in the ordered list. If the new position is the last position in the ordered list, at block 612, a temporary next order value is set according to a maximum order value. A maximum order value represents the next order value for a list item added to the ordered list. According to one embodiment, the maximum order value is determined by multiplying the number of list items in the list plus one by a predetermined increment. By setting the predetermined increment to a sufficiently large number, multiple modifications to the order of list items in an ordered list may be performed without requiring that the order values of the entire list be reset. Resetting the order values of the entire ordered list, as well as when such a reset should occur, is described below in regard to FIG. 7. Preferably, the predetermined increment is 100.00.

Alternatively, if the new position is not the last item in the ordered list, at block 614, the temporary next order value is set according to the order value of the next list item in the ordered list. At block 616 (FIG. 6B), the temporary previous order value and temporary next order value are added together. At block 618, the resulting sum is divided by two. The result of this division represents the updated order value for the list item unless a precision error occurs. Thus, referring to table 910 in FIG. 9, the order value for list' item 402 is set at 150.00, which represents the sum of the order value of list item 412 (200.00) plus the order value of list item 902 (100.00), divided by two.

With reference again to FIG. 6B, at decision block 620, a determination is made as to whether there were any precision errors. A precision error arises if the result of the division is equal to the temporary previous order value or the temporary next order value. Precision errors of this kind are known in the art. If a precision error is detected, at block 622, the order values for the entire ordered list are reset. A greater description of resetting the order values for the ordered list is provided in regard to FIG. 7.

Figure 7:
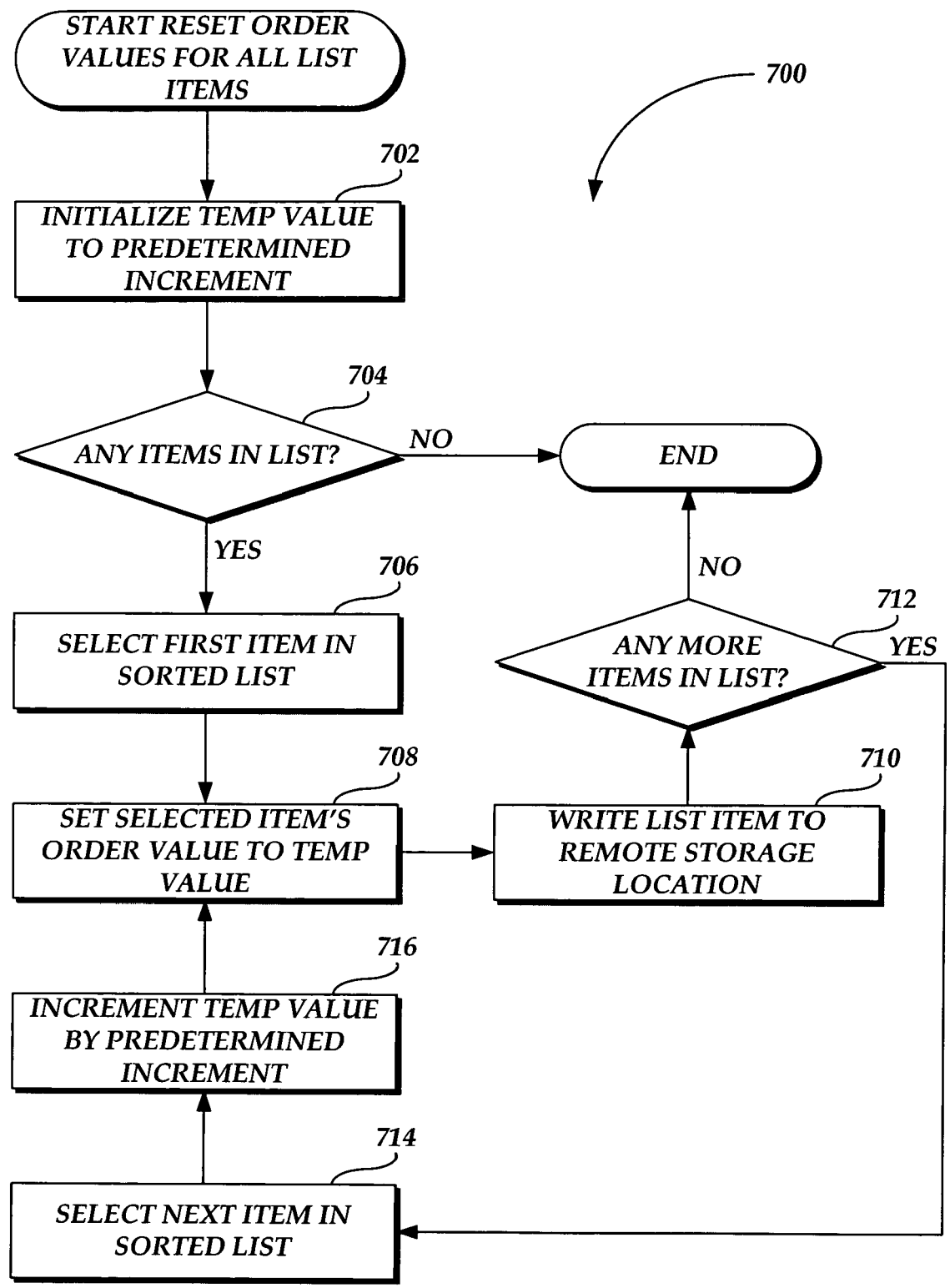
FIG. 7 is a flow diagram illustrating an exemplary reset order values routine suitable for use in the update list item's order value subroutine of FIGS. 6A and 6B for resetting the order values of all list items in a list.

FIG. 7 is a block diagram illustrating an exemplary reset order values routine 700 for resetting the order values of all list items in an ordered list. Beginning at block 702, a temporary value is initialized to a predetermined increment. This represents the same predetermined increment described above in regard to FIGS. 6A and 6B. At decision block 704, a check is made to determine whether there are any list items in the ordered list. If there are no list items in the ordered list, the exemplary routine 700 terminates. Alternatively, if there are list items in the list, at block 706, the first list item in the list is selected. At block 708, the selected list item's order value is set to the temporary value. At block 710, the selected list item is written to the remote storage location. Alternatively (not shown), storing the updated list items to the remote storage location may be deferred until all list items have been processed. However, those skilled in the art will recognize that many input/output (I/O) systems used by routines such as this reset order values routine 700 buffer storage requests until an adequate amount of data may be transferred or an explicit directive to write the buffered data is sent. Thus, under such an I/O system, it may be irrelevant whether the list items are stored immediately or whether all list items are stored in one action.

At decision block 712, a determination is made as to whether there are any more list items in the ordered list that have not been reset. If there are no list items remaining in the list to be reset, the routine 700 terminates. Alternatively, if there are more list items in the ordered list to be reset, at block 714, the next list item in the ordered list is selected.

At block 716, the temporary value is incremented according to the predetermined increment. Thereafter, returning again to block 708, the next item's order value is set according to the temporary value. At block 710, the selected list item is saved to the remote storage location, and at decision block 712, a determination again is made as to whether there are any remaining list items in the ordered list to be reset. The routine 700 continues until, at decision block 712, there are no more remaining list items in the ordered list to be reset.

With reference again to FIG. 6B, at block 622, after having reset the order values for the list items in the ordered list, as described above, the process returns to block 602 to update the selected list item. Alternatively, at decision block 620, if no precision error is detected, at block 624, the selected list item's order value is set to the division result. At block 626, the list item is written to the remote storage location. As similarly discussed above, as an alternative (not shown) to immediately writing the selected list item to the remote storage location, the selected list item could be marked as "dirty," i.e., needing to be written to the remote storage location, and be processed with any other "dirty" list items with a single directive. Thereafter, the routine 600 terminates.

With reference again to FIG. 5, after updating the selected item's order value in block 512, a determination is made at decision block 514 whether any more list items were moved that have not been processed. If additional list items remain to be processed, at block 516, a next list item on the temporary list is selected. Returning again to block 508, the selected list item's new position is recalled. Returning again to block 510, the selected list item is added to the ordered list at the recalled position. Again at block 512, the selected list item's order value is updated. At decision block 514, a determination is again made whether other list items remain to be processed. This process continues until all moved list items have been processed. As previously discussed, storing the updated list items may be deferred until all list items have been updated. Accordingly, after it is determined, at decision block 514, that all moved list items have been updated, (not shown) those move list items that are "dirty" are stored to the remote storage location. Thereafter, the routine 500 terminates.

While illustrative embodiments have been illustrated and described, it will be appreciated that various changes can be made therein without departing from the spirit and scope of the invention.

The embodiments of the invention in which an exclusive property or privilege is claimed are defined as follows:

1. A method for modifying and updating the order of list items in an ordered list in a Web page using a Web browser, the method comprising:
   obtaining a Web page including a copy of a source list on a remote server using a Web browser, the copy of the source list comprising a plurality of list items, wherein each of the plurality of list items includes an internal order value;
   displaying an ordered list of the plurality of list items on a Web browser, wherein an ordinal position of each of the plurality of list items displayed in the ordered list being determined according to their internal order values;
   displaying a position control corresponding to each of the plurality of list items, wherein each position control of a list item may be manipulated by a user to select a new internal order value to change the ordinal position in the ordered list for its corresponding list item;
   monitoring for user actions manipulating any of the position controls of the plurality of list items in the ordered list; and
   upon detecting a user action manipulating a position control of at least one of the plurality of list items in the ordered list:
   identifying a list item associated with each manipulation of a position control of at least one of the plurality of list items in the ordered list;
   setting a flag associated with each of the identified list item based on each manipulation of a position control by a user for the plurality of list items in the ordered list to a dirty state;
   identifying a new internal order value for each of the identified list item based on each manipulation of a position control by a user for the plurality of list items in the ordered list; and
   rearranging the ordinal position of the plurality of list items displayed in the ordered list according to their internal order values after manipulation of the position controls of the plurality of list items in the ordered list.

2. The method of claim 1 further comprising:
   monitoring for user actions committing the changes to the order of the plurality of list items in the ordered list to the source location; and
   upon detecting a user action committing the changes to the order of the plurality of list items in the ordered list to the source location, committing the changes to the source location on the remote server.

3. The method of claim 2, wherein committing the changes to the source location on the remote server comprises:
   identifying those list items in the ordered list that were moved within the ordered list, wherein identifying those list items in the ordered list that were moved comprises identifying those list items associated with the flag set to the dirty state; and
   for each identified list item:
      determining a previous order value for the identified list item;
      determining a next order value for the identified list item; and
      setting the identified list item's internal order value to the average value of the previous order value and the next order value.

4. The method of claim 3, further comprising posting the new order values of the list items in the ordered list that were moved within the ordered list to the remote server, and;
   wherein the remote server determines the previous order value and the next order value for the identified list item and setting the identified list items internal order value to the average of the previous order value and the next order value.

5. The method of claim 3 further comprising placing the identified list items in a temporary list while retaining their new ordinal positions in the ordered list.

6. The method of claim 5 further comprising, for each identified list item in the temporary list, removing the identified list item from the temporary list and placing the identified list item back in the ordered list at its retained ordinal position after setting the identified list item's internal order value to the average value of the previous order value and the next order value.

7. The method of claim 6, wherein determining a previous order value for the identified list item comprises:
   determining whether the identified list item is the first list item in the ordered list, and if so, setting the previous order value to zero; otherwise,
   setting the previous order value to the internal order value of the previous list item in the ordered list.

8. The method of claim 7, wherein determining a next order value for the identified list item comprises:
   determining whether the identified list item is the last list item in the ordered list, and if so, setting the next order value to a maximum order value; otherwise,
   setting the next order value to the internal order value of the next list item in the ordered list.

9. The method of claim 8, wherein the maximum order value is the product of the number of list items in the ordered list plus one times a predetermined increment.

10. The method of claim 3 further comprising checking for precision errors arising from averaging the previous order value and the next order value, and if a precision error is detected:
    resetting the internal order values of each list item in the ordered list; and
    updating each list item's order value in the source location.

11. The method of claim 10, wherein resetting the internal order values for each list item in the ordered list comprises:
    setting the internal order value of the first list item in the ordered list to a predetermined increment; and
    for each additional list item in the ordered list:

setting the additional list item's internal order value to the previous list item's internal order value plus the predetermined increment.

12. The method of claim 10, wherein checking for precision errors arising from averaging the previous order value and the next order value comprises comparing the result of averaging the previous order value and the next order value, such that if the result of the averaging is equal to the previous order value or the next order value, a precision error occurred.

13. The method of claim 1, wherein the internal order value is a floating point value.

14. A computer-readable medium having computer-executable instructions which, when executed, carry out a method for modifying and updating the order of list items in an ordered list in a Web page using a Web browser, the method comprising:

obtaining a Web page including a copy of a source list on a remote server using a Web browser, the copy of the source list comprising a plurality of list items, wherein each list item includes an internal order value;

displaying an ordered list of the plurality of list items on a Web browser, wherein an ordinal position of each of the plurality of list items displayed in the ordered list being determined according to their internal order values;

displaying a position control corresponding to each of the plurality of list items, wherein each position control of a list item may be manipulated to select a new internal order value to change the ordinal position in the ordered list for its corresponding list item;

monitoring for user actions manipulating any of the position controls of the plurality of list items in the ordered list; and upon detecting a user action manipulating a position control of at least one of the plurality of list items in the ordered list:

identifying a list item associated with each manipulation of a position control of at least one of the plurality of list items in the ordered list;

setting a flag associated with each of the identified list item based on each manipulation of a position control by a user for the plurality of list items in the ordered list to a dirty state;

identifying a new internal order value for each of the identified list item based on each manipulation of a position control for the plurality of list items in the ordered list; and rearranging the ordinal position of the plurality of list items displayed in the ordered list according to their internal order values after manipulation of the position controls of the plurality of list items in the ordered list.

* * * * *